United States Patent [19]
Peachey

[11] Patent Number: 5,974,774
[45] Date of Patent: Nov. 2, 1999

[54] COMBINATION RAKE AND TEDDER

[76] Inventor: Jess S. Peachey, R.D. #1, Box 47, Reedsville, Pa. 17084

[21] Appl. No.: 09/015,170

[22] Filed: Jan. 29, 1998

Related U.S. Application Data

[60] Provisional application No. 60/036,972, Jan. 29, 1997.

[51] Int. Cl.$^6$ .................................................. A60D 76/00
[52] U.S. Cl. .............................. 56/365; 56/370; 56/372
[58] Field of Search ............................ 56/365, 366, 370, 56/374, 376, 379, 380, 384, 396

[56] References Cited

U.S. PATENT DOCUMENTS

| | | |
|---|---|---|
| 114,065 | 4/1871 | Thayer . |
| 181,694 | 6/1876 | Loader . |
| 186,346 | 1/1877 | Huber et al. . |
| 370,169 | 9/1887 | Utter . |
| 372,344 | 11/1887 | Utter . |
| 933,785 | 9/1909 | Preuss . |
| 1,334,953 | 3/1920 | Holtvoigt . |
| 1,790,447 | 1/1931 | Siegnethaler . |
| 2,529,577 | 11/1950 | Schempp et al. . |
| 2,609,651 | 9/1952 | Cymara . |
| 2,679,720 | 6/1954 | Cymara . |
| 2,751,745 | 6/1956 | Magee . |
| 2,761,270 | 9/1956 | Blaser et al. . |
| 3,084,497 | 3/1961 | Reilly . |
| 3,478,500 | 11/1969 | Rhoads . |
| 3,702,052 | 11/1972 | Klassen . |
| 3,879,923 | 4/1975 | Granger ...................................... 56/376 |
| 3,884,022 | 5/1975 | Landolt . |
| 4,099,364 | 7/1978 | Kanengieter et al. .......................... 56/1 |
| 4,265,076 | 5/1981 | Krutz ........................................ 56/14.4 |
| 4,524,576 | 6/1985 | Probst ........................................ 56/372 |
| 4,656,821 | 4/1987 | Aron . |
| 4,738,092 | 4/1988 | Jennings . |
| 4,739,610 | 4/1988 | Schultz . |
| 4,748,803 | 6/1988 | MacMaster et al. . |
| 4,793,125 | 12/1988 | Ehrhart et al. . |
| 4,862,685 | 9/1989 | Gasseling et al. .......................... 56/372 |
| 5,175,987 | 1/1993 | Underhill et al. . |
| 5,177,944 | 1/1993 | Finlay . |
| 5,203,154 | 4/1993 | Lesher et al. . |
| 5,231,826 | 8/1993 | Jennings . |
| 5,301,496 | 4/1994 | Sudbrack et al. .......................... 56/366 |
| 5,450,717 | 9/1995 | Delperdang et al. . |
| 5,507,139 | 4/1996 | Delperdang et al. . |

OTHER PUBLICATIONS

New Holland; Window Inverter 166, Apr. 22, 1994.

*Primary Examiner*—Thomas B. Will
*Assistant Examiner*—Arpad Fabian Kovacs
*Attorney, Agent, or Firm*—Webb Ziesenheim Logsdon Orkin & Hanson, P.C.

[57] ABSTRACT

A device is provided for raking and tedding a crop, such as hay. The device includes a frame with a main conveyor rotatably mounted on the frame. The main conveyor has an input end and a discharge end. A pick-up roller is located adjacent the input end of the main conveyor. A rear conveyor assembly is located adjacent the discharge end of the main conveyor. The rear conveyor assembly includes at least one auxiliary conveyor having a first end and a second end, with the second end of the at least one auxiliary conveyor pivotally mounted on the frame. Also, a raking and tedding device is provided in which the rear conveyor assembly includes a lateral conveyor hingedly mounted on the frame and configured to move from a first, operative position under the discharge end of the main conveyor to a second, inoperative position.

17 Claims, 3 Drawing Sheets

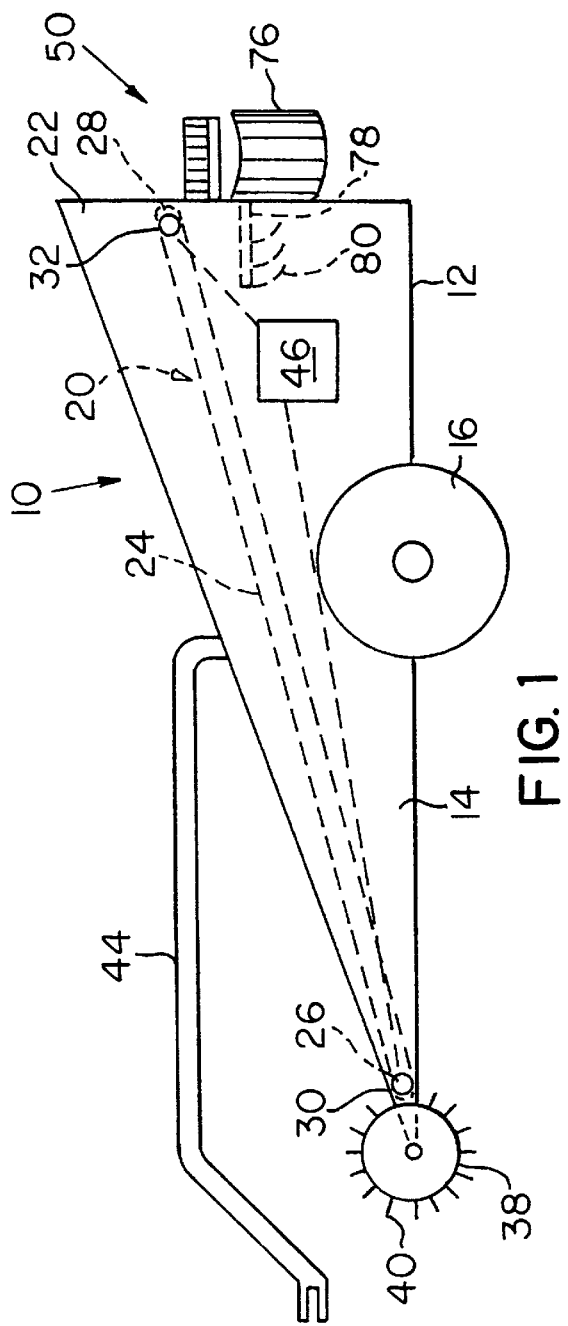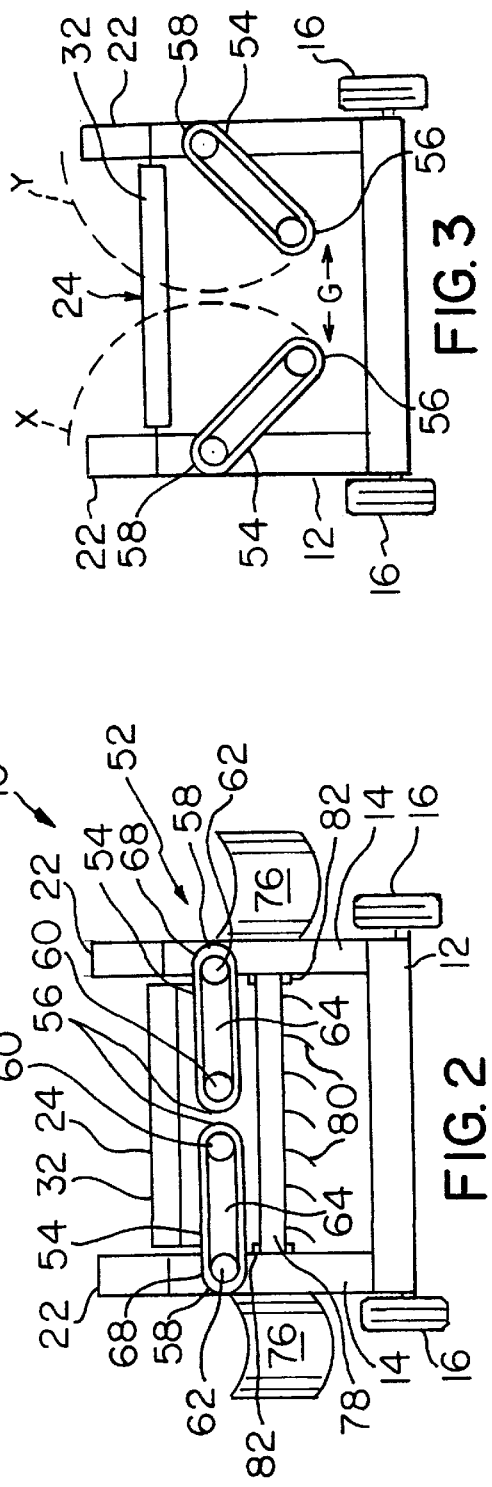

COMBINATION RAKE AND TEDDER

CROSS REFERENCE TO RELATED APPLICATION

This application claims the benefits of United States Provisional Application Ser. No. 60/036,972 filed on Jan. 29, 1997.

BACKGROUND OF THE INVENTION

1. Field of the Invention

The present invention relates generally to a device for harvesting crops and, more particularly, to a device configured to both rake and ted the crop.

2. Description of the Prior Art

In harvesting crop material, such as hay, the hay is generally cut by a mower which lays the hay down in swaths approximately 7 to 9 feet wide. It is impractical to pick up and bale the hay when the moisture content of the hay is high. Therefore, the cut hay is typically left in the field to dry naturally by the sun. However, if the hay is left to dry too long, the action of the sun causes some of the nutrient value of the hay to be lost. Further, the longer the hay lies drying, the greater is the chance that the grain structure of the hay will be destroyed. Therefore, it is important to dry the hay as quickly as possible. To accelerate drying after the hay has been cut, it is desirable to pick up and fluff the hay and then lay the hay back down on the ground in order to promote more even drying. This pick up and fluffing of the swath is known as tedding.

Additionally, the hay in the swath may be collected and formed into relatively narrow rows called windrows. This operation is generally called raking. After raking, the ground under the windrow may become wet due to moisture and by being covered by the windrow. This causes uneven drying of the hay, i.e., the top part of the windrow dries but the bottom part remains wet. Therefore, there is a need to pick up the windrow, aerate it and then return the hay back onto the ground in a windrow to facilitate more even drying.

It is customary to use different apparatuses for raking and tedding. The need to have separate tedding and raking devices increases the cost of crop harvesting. In addition to the initial cost of each device, each device must also be separately maintained and serviced to keep the device in working order. Further, two separate devices take up more valuable storage space than would a single device.

Therefore, it is an object of the present invention to provide a single device which may be used to both rake and ted a crop. Further, it is an object of the present invention to provide a device with which the crop can be easily and quickly formed into windrows on either side of the device or directly behind the device. It is additionally an object of the invention to provide a device in which the crop can be picked up, turned over and formed into windrows on either side of the device.

SUMMARY OF THE INVENTION

A device is provided for raking and tedding a crop, such as hay. The device includes a frame with a main conveyor rotatably mounted on the frame. The main conveyor has an input end and a discharge end. A pick-up roller is located adjacent the input end of the main conveyor. A rear conveyor assembly is located adjacent the discharge end of the main conveyor. The rear conveyor assembly includes at least one auxiliary conveyor having a first end and a second end, with the second end of the at least one auxiliary conveyor pivotally mounted on the frame.

Also, a raking and tedding device is provided having a frame and a main conveyor rotatably mounted on the frame. The main conveyor has an input end and a discharge end. A pick-up roller is located adjacent the input end of the main conveyor and a rear conveyor assembly is located adjacent the discharge end of the main conveyor. The rear conveyor assembly includes a lateral conveyor hingedly mounted on the frame and configured to move from a first, operative position substantially under the discharge end of the main conveyor to a second, inoperative position.

A complete understanding of the invention will be obtained from the following description when taken in connection with the accompanying drawing figures wherein like reference characters identify like parts throughout.

BRIEF DESCRIPTION OF THE DRAWINGS

FIG. 1 is a side view of a combination rake and tedder device of the present invention;

FIG. 2 is a rear view of the device shown in FIG. 1 showing a rear conveyor assembly formed by a split conveyor assembly having two auxiliary conveyors which are positioned in a lateral raking configuration;

FIG. 3 is a rear view of the device shown in FIG. 2 with the auxiliary conveyors in an in-line raking configuration;

DESCRIPTION OF THE PREFERRED EMBODIMENTS

Figure 4:
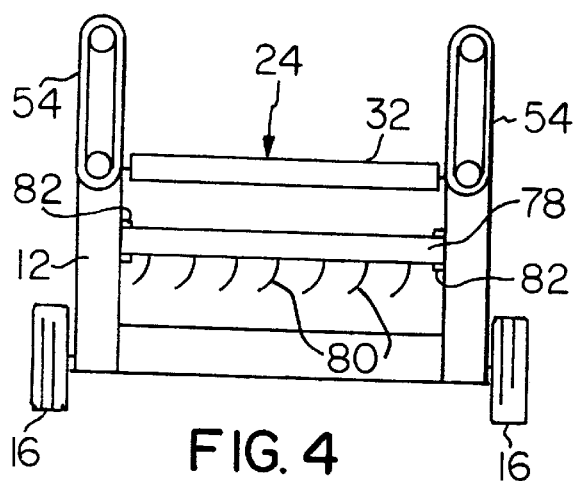
FIG. 4 is a rear view of the hay tedder shown in FIG. 2 with the auxiliary conveyors in a tedding configuration.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific device and processes illustrated in the attached drawings, and described in the following specification, are simply exemplary embodiments of the invention. Hence, specific dimensions and other physical characteristics related to the embodiments disclosed herein are not to be considered as limiting.

A combination rake and tedder device according to the present invention is generally designated 10 in FIGS. 1 and 2 of the drawings. The device 10 comprises a frame 12 having substantially triangular sides 14. A pair of main wheels 16 are rotatably mounted on an axle carried on the frame 12. The device 10 may also include a pair of auxiliary wheels (not shown) mounted on the frame 12 forward of the main wheels 16 to provide additional support for the device 10. The frame 12 and sides 14 are preferably made of metal.

A main conveyor assembly 20 is carried on the frame 12 between the two sides 14. A pair of side boards 22 are located along the sides of the main conveyor assembly 20. The side boards 22 may be separate pieces or may be integral with the sides 14.

The main conveyor assembly includes a main conveyor 24 in the form of an endless, canvas belt. The belt is preferably about 7–9 feet wide and is rotatably mounted around a front roller 26 and a rear roller 28. The front and rear rollers 26 and 28 are rotatably carried on the frame 12. The main conveyor 24 has a first or input end 30 located at the front of the device 10 and a second or discharge end 32 located at the rear of the device 10. As shown in FIG. 1, the main conveyor 24 is inclined on the frame 12 with the discharge end 32 being higher than the input end 30. The side boards 22 preferably extend above the top of the main conveyor 24.

A pick-up roller 38 is rotatably mounted on the frame 12 in front of the input end 30 of the main conveyor 24, for example, on an axle attached to the frame 12. The pick-up roller 38 is substantially cylindrical and has a plurality of pick-up members in the form of elongated fingers or prongs 40 extending from the surface of the pick-up roller 38. While the prongs 40 may extend perpendicularly from the pick-up roller 38, in the preferred embodiment, the prongs 40 extend at an angle, preferably a lateral angle, from the surface of the pick-up roller 38 to permit the roller 38 to pick up straight cut hay. A tongue 44 is attached to the device 10 and is used to attach the device 10 to a motive unit, such as a tractor or a horse.

To drive the main conveyor 24 and pick-up roller 38, conventional drive devices, such as a conventional gear wheel assembly, may be mounted on the device 10. Such conventional gear wheel assemblies typically include a gear wheel mounted on the axle carrying the main wheels 16. This gear wheel engages a conventional chain or belt system connected to one of the rollers 26 or 28 of the main conveyor assembly 20 and/or the pick-up roller 38 such that rotation of the main wheels 16 causes the belt system to rotate the main conveyor 24 and/or the pick-up roller 38. Such conventional gear wheel assemblies are well-known in the art and one such system is shown in U.S. Pat. No. 2,529,577, which is herein incorporated by reference. Alternatively, the pick-up roller 38 and main conveyor 24 may be powered by one or more conventional hydraulic motor assemblies. The hydraulic motor assemblies may be connected to the hydraulic system of the tractor pulling the device or may be self-contained units powered by a small engine carried on the device itself. A conventional hydraulic motor system is disclosed in U.S. Pat. No. 5,231,826, which is herein incorporated by reference. A hydraulic motor assembly 46 is schematically shown in FIG. 1 of the drawings attached to the rear roller 28 and the pick-up roller 38.

A rear conveyor assembly 50 is mounted on the rear of the device 10. A first embodiment of the rear conveyor assembly 50 is shown in FIGS. 2–4 of the drawings. In this first embodiment, the rear conveyor assembly 50 includes a split conveyor assembly 52 mounted on the rear of the frame 12 below the discharge level of the main conveyor 24. The split conveyor assembly 52 is formed by a pair of opposed, separately movable, auxiliary conveyors 54. Each auxiliary conveyor has a first or inner end 56 and a second or outer end 58, with the outer end 58 of each auxiliary conveyor 54 pivotally mounted on the frame 12. The outer ends 58 of the auxiliary conveyors 54 are preferably mounted at substantially the same height on opposite sides of the frame 12. Thus, the auxiliary conveyors 54 may pivot in a plane substantially perpendicular to the movement direction of the device 10.

Each auxiliary conveyor 54 includes an inner roller 60 and an outer roller 62 rotatably mounted on a conveyor platform 64. An endless auxiliary conveyor belt 68 is rotatably carried around the rollers 60 and 62. The auxiliary conveyors 54 may be powered by a gear wheel assembly or a hydraulic motor assembly as discussed above. Alternatively, a separate hydraulic motor assembly can be used to power each auxiliary conveyor 54. A conventional locking mechanism is carried on the device 10 to lock the auxiliary conveyors 54 at a selected position. The locking mechanism can be a mechanical system, for example a retractable pin mounted on each auxiliary conveyor 54 and configured to engage one of a plurality of holes arranged in a circle formed in the frame 12 adjacent the pivot point of the auxiliary conveyor 54. Alternatively, the auxiliary conveyors 54 may be pivoted by a hydraulic motor system and held in place by a hydraulic lock. As shown in FIG. 3 of the drawings, in the first embodiment of the rear conveyor assembly 50, an arc of movement X of the inner end 56 of the left auxiliary conveyor 54 does not overlap with an arc of movement Y of the inner end 56 of the right auxiliary conveyor 54 between the two sides 14.

As shown in FIG. 2, a discharge chute 76 is removably mounted on one or both sides of the frame 12 adjacent the outer ends 58 of the auxiliary conveyors 54. The discharge chute 76 is preferably trough-shaped and formed of metal.

A fluffer assembly 78 may be removably mounted at the rear of the frame 12 below the discharge level of the main conveyor 24. The fluffer assembly 78 includes a plurality of elongated projections or fingers 80 and is preferably retractable to move from a stowed position substantially within the frame 12 under the main conveyor 24 to an operating position substantially under and vertically aligned with the discharge end of the main conveyor 24. For example, the fluffer assembly 78 may be slidably mounted on a pair of tracks 82 carried on the frame 12 such that the fluffer assembly 78 is slidable from a first or inner position in which the fingers 80 are substantially not vertically aligned with the discharge end 32 of the main conveyor 24 to a second or outer position in which the fingers 80 are substantially vertically aligned with the discharge end 32 of the main conveyor 24.

Figure 5:
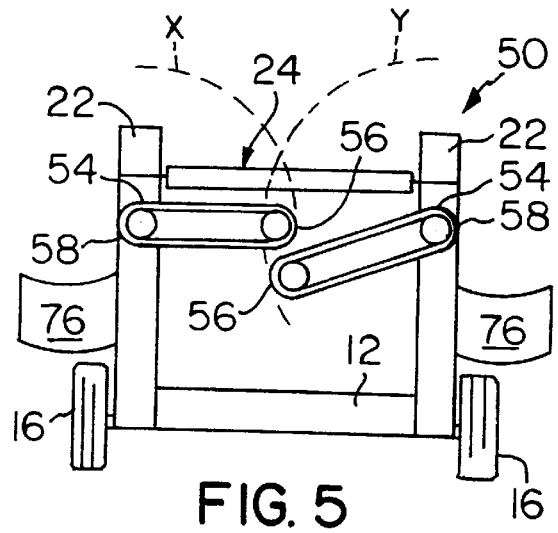
FIG. 5 shows an alternative embodiment of the rear conveyor assembly with the auxiliary conveyors in a first lateral raking configuration.

A second embodiment of the rear conveyor assembly 50 is shown in FIGS. 5–9 of the drawings. The second embodiment is similar to the first embodiment shown in FIGS. 2–4 except that the two auxiliary conveyors 54 are dimensioned such that an arc of movement X of the inner end 56 of the left auxiliary conveyor 54 overlaps the arc of movement Y of the inner end 56 of the right auxiliary conveyor 54, as shown in FIG. 5. This overlap is preferably about 5 inches wide.

Figure 10:
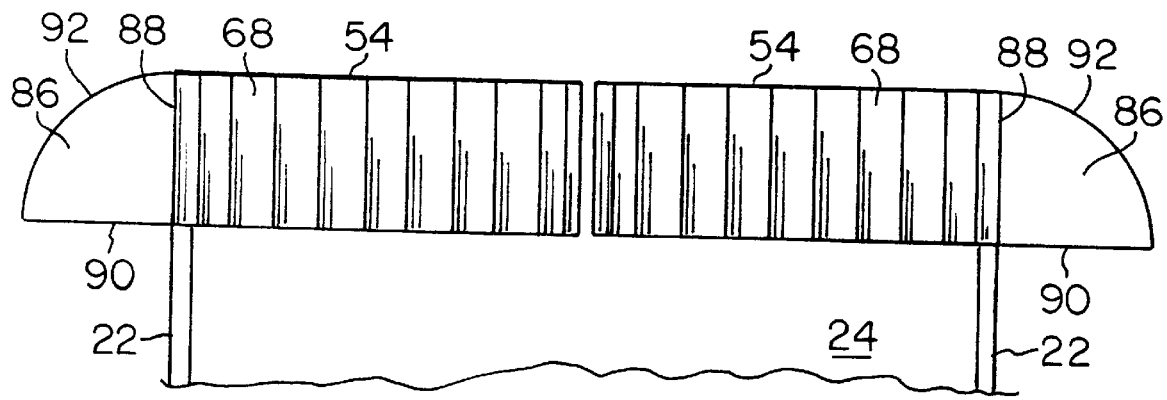
FIG. 10 is a plan view of the device shown in FIG. 2 having a pair of turn-over rakes located at the sides of the device.

In the device 10 shown in FIG. 10 of the drawings, the discharge chutes 76 are replaced by a pair of turn-over chutes 86 removably positioned adjacent the outer ends 58 of the auxiliary conveyors 54. Each turn-over chute 86 has an inner side 88, an outer side 90 and a curved back side 92. The turn-over chutes 86 are preferably made of metal.

Figure 11:
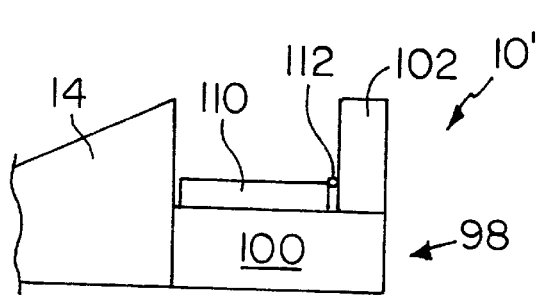
FIG. 11 is a side view of a rear portion of an alternative embodiment of the combination rake and tedder device with a rear conveyor in a lowered position.
Figure 13:
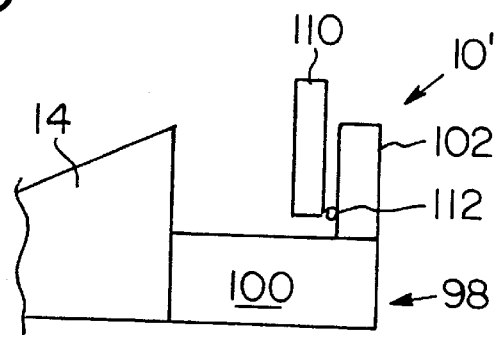
FIG. 13 is a side view of the device of FIG. 11 with the rear conveyor in a raised position.
Figure 14:
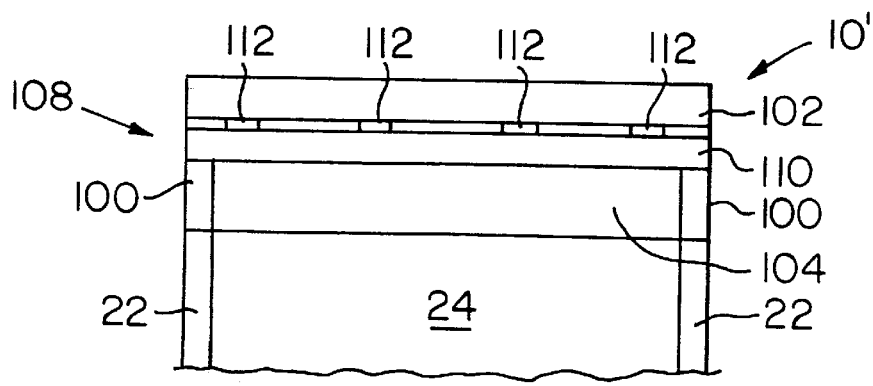
FIG. 14 is a plan view of the device of FIG. 13.

An alternative embodiment of the device is designated 10' in FIGS. 11–14 of the drawings. In this embodiment, the split conveyor assembly 52 is removed and the rear portion of the device 10' is modified to include an extension frame assembly 98. As shown in FIGS. 11 and 14 of the drawings, the extension frame assembly 98 includes a pair of opposed side frames 100 extending from the rear of the frame 12 and a rear wall 102 attached at the outer ends of the side frames 100. The opposed side frames 100 and rear wall 102 define a vertical passage 104, as shown in FIG. 14.

Figure 12:
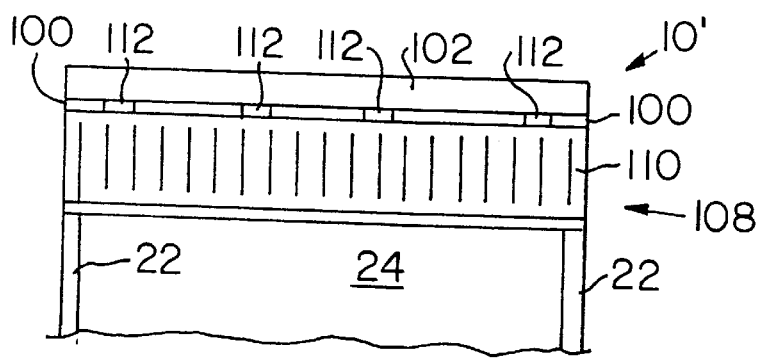
FIG. 12 is a plan view of the device of FIG. 11.

As shown in FIGS. 11 and 12 of the drawings, a modified rear conveyor assembly 108 is mounted on the extension frame assembly 98. The modified rear conveyor assembly 108 includes a unitary, lateral rear conveyor 110 rotatably mounted around a pair of spaced rollers in conventional manner. The rear conveyor 110 is pivotally attached to the rear wall 102 by a plurality of hinges 112. As shown in FIGS. 13 and 14 of the drawings, the rear conveyor 110 can pivot around the hinges 112 from a lowered position shown in FIGS. 11 and 12 of the drawings to a raised position shown in FIGS. 13 and 14 of the drawings. The rear conveyor 110 may be powered by a hydraulic motor or a conventional gear wheel assembly, as discussed above, and may selectively turn either to the left or the right with respect to the device 10'. Although not specifically shown in FIGS. 11–14 of the drawings, discharge chutes or turn-over chutes, such as those described above, may be removably attached to the side frames 100 near the ends of the rear conveyor 110.

Operation of the devices 10 and 10' will now be described. Looking first at the embodiment of the device 10 shown in FIGS. 1–4 of the drawings, the auxiliary conveyors 54 are first positioned in accordance with the task to be accomplished. Each auxiliary conveyor 54 is pivoted to the required position and then held in place by the associated locking mechanism. For example, to laterally rake the hay to one side of the device 10, the two auxiliary conveyors 54 are positioned substantially laterally as shown in FIG. 2 of the drawings. The device 10 is attached to a tractor or a horse and is pulled through the field along the swath of hay. The hay is picked up off of the ground by the cylindrical pick-up roller 38 and is deposited on the input end of the main conveyor 24. As the main conveyor 24 rotates, the hay is carried upwardly and rearwardly by the main conveyor 24 and, is discharged onto the top of the auxiliary conveyors 54.

In order to rake the hay to the right side of the frame 12, both auxiliary conveyors 54 would be rotated toward the right. Thus, as the hay is discharged from the main conveyor 24, it drops onto the top of the auxiliary conveyors 54 and is transported to the right into the discharge chute 76, where it is deposited in a windrow along the right side of the device 10. To rake the hay to the left side of the device 10, the two auxiliary conveyors 54 would be rotated to the left to deposit the hay in the discharge chute 76 located on the left side of the frame 12. Alternatively, to rake the hay to both sides of the frame 12 simultaneously, the left auxiliary conveyor 54 is rotated to the left and the right auxiliary conveyor 54 is rotated to the right such that as the hay is discharged from the main conveyor 24, about half of the hay will drop onto the left auxiliary conveyor 54 and be transported to the left discharge chute 76 to form a windrow on the left side of the frame 12 while the other half of the hay drops onto the top of the right auxiliary conveyor 54 and is transported to the right discharge chute 76 to form a windrow on the right side of the frame 12.

In order to form an in-line windrow, i.e., a single windrow behind the device 10, the two auxiliary conveyors 54 are pivoted to the positions shown in FIG. 3 of the drawings and held in place by the locking mechanism so that the inner ends 56 of the auxiliary conveyors 54 are lower than the outer ends 58 of the auxiliary conveyors 54 and a gap G is formed between the inner ends 56 of the two auxiliary conveyors 54. In this configuration, both auxiliary conveyors 54 are made to rotate inwardly, i.e., towards the middle of the frame 12, so that as the hay is discharged from the main conveyor 24, it falls onto the upper side of the auxiliary conveyors 54 and is transported towards the gap G where it falls to the ground to form a single windrow directly behind the device 10.

In order to ted the hay, the auxiliary conveyors 54 are pivoted upwardly and held in position as shown in FIG. 4 of the drawings. The fluffer assembly 78 is moved from its retracted, inner position to an outer position substantially under the discharge end of the main conveyor 24. Thus, as the hay is discharged from the main conveyor 24, it falls through the fingers 80 of the fluffer assembly 78 where it is aerated and then redeposited on the ground behind the device 10.

The operation of the embodiment of the rear conveyor assembly 50 shown in FIGS. 5–9 of the drawings will now be described. In order to rake the hay to the right side of the device 10, the two auxiliary conveyors 54 are pivoted and positioned as shown in FIG. 5 of the drawings with the inner end 56 of the right auxiliary conveyor 54 located below the inner end 56 of the left auxiliary conveyor 54. In this configuration, both auxiliary conveyors 54 are rotated toward the right. Thus, as hay is discharged from the main conveyor 24, it falls onto the top of each auxiliary conveyor 54 and is transported to the right. Hay landing on top of the left auxiliary conveyor 54 moves to the right and falls on top of the right auxiliary conveyor 54. The hay is then transported into the discharge chute 76 on the right side of the frame 12 and is deposited in a windrow along the right side of the device 10.

Figure 6:
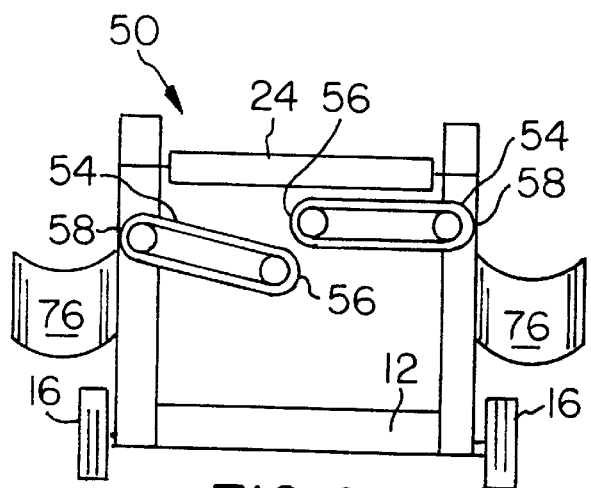
FIG. 6 shows the split conveyors of FIG. 5 in a second lateral raking configuration.

FIG. 6 of the drawings shows the position of the auxiliary conveyors 54 for raking hay to the left side of the frame 12. In this configuration, the inner end 56 of the left auxiliary conveyor 54 is positioned below the inner end 56 of the right auxiliary conveyor 54 and both auxiliary conveyors 54 are rotated to the left. Thus, as hay is discharged from the main conveyor 24, it falls onto the top of the auxiliary conveyors 54 and is transported to the discharge chute 76 on the left side of the frame 12 to form a windrow on the left side of the device 10.

Figure 7:
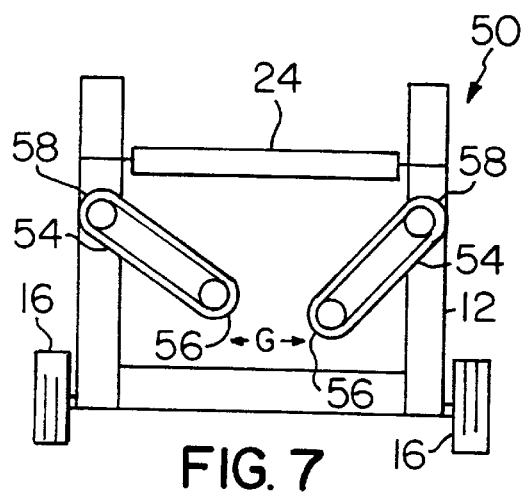
FIG. 7 shows the split conveyors of FIG. 5 in an in-line raking configuration.

FIG. 7 of the drawings shows the position of the auxiliary conveyors 54 to form a windrow directly behind the device 10. This configuration is similar to the configuration for the first embodiment shown in FIG. 3 of the drawings. In this configuration, each auxiliary conveyor 54 rotates inwardly such that the hay falling from the discharge end 32 of the main conveyor 24 is transported inwardly to the gap G and forms a windrow directly behind the device 10.

Figure 8:
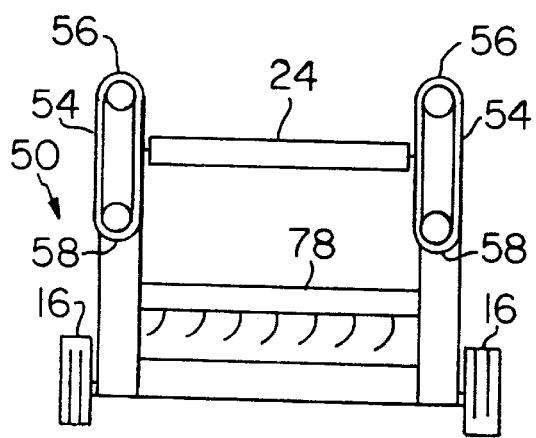
FIG. 8 shows the split conveyors of FIG. 5 in a tedding configuration.

FIG. 8 of the drawings shows the configuration of the auxiliary conveyors 54 for tedding the hay. Operation of this configuration is the same as the operation of the first embodiment shown in FIG. 4 of the drawings and described hereinabove.

Figure 9:
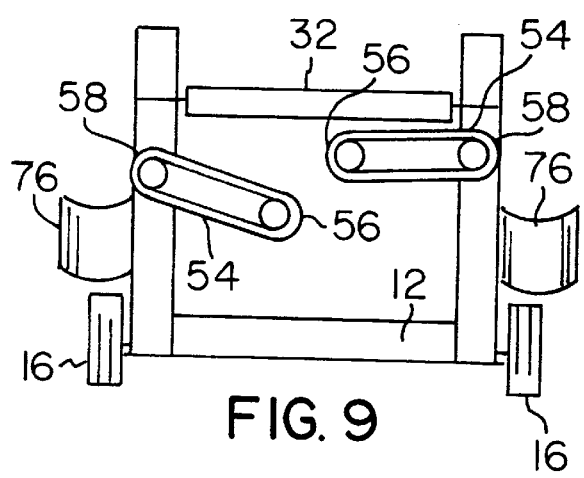
FIG. 9 shows the conveyors of FIG. 5 in a dual raking configuration.

FIG. 9 of the drawings shows a configuration of the auxiliary conveyors 54 used to rake very thick rows of hay. In this configuration, one of the auxiliary conveyors, for example the left auxiliary conveyor 54, is positioned such that the inner end 56 of the left auxiliary conveyor 54 points downwardly and there is a gap G formed between the two auxiliary conveyors 54. The left auxiliary conveyor 54 is rotated to the right. The other auxiliary conveyor, for example the right auxiliary conveyor 54, is positioned substantially horizontally with the right auxiliary conveyor 54 also turning to the right. Thus, as the hay falls from the discharge end 32 of the main conveyor 24, approximately half of the hay will fall onto the left auxiliary conveyor 54 and will be transported downwardly to form a windrow behind the device 10 and the other half of the hay will fall on the right auxiliary conveyor 54 and will be transported to the right discharge chute 76 to form a windrow on the right side of the device 10. It will be understood by one of ordinary skill in the art that the positions and direction of operation of the two auxiliary conveyors 54 could be reversed to form an in-line windrow and a windrow on the left side of the device 10.

In FIG. 10 of the drawings, the conventional discharge chutes 76 are replaced by so-called turn-over chutes 86. The hay is picked up and moved along the main conveyor 24 and auxiliary conveyors 54 as described above with respect to the first embodiment shown in FIGS. 1–4 of the drawings. The hay is transported on the auxiliary conveyors 54 as discussed above to one or both of the turn-over chutes 86. When the hay enters the inner side 88 of the turn-over chute 86, it is guided around the curved back side 92 and exits the turn-over chute 86 from the outer side 90. As the hay leaves the turn-over chute 86, it is automatically turned over as it falls to the ground.

Operation of the embodiment of the device 10' shown in FIGS. 11–14 of the drawings will now be described. In the normal raking configuration shown in FIGS. 11 and 12 of the drawings, the rear conveyor 110 is in the lowered position and hay from the main conveyor 24 drops down on top of the rear conveyor 110. This hay can be transported either to the right side or left side of the device 10', depending on which way the rear conveyor 110 is rotating, and through a discharge chute 76 or turn-over chute 86. Thus, a row of hay can be formed on either side of the device 10'.

To ted hay with this embodiment, the rear conveyor 110 is raised by pivoting the rear conveyor 110 around the hinges 112 to move the rear conveyor 110 to a substantially upright position, as shown in FIGS. 13 and 14 of the drawings. The rear conveyor 110 can be held in this raised position by conventional methods, such as a hook or holding strap. With the rear conveyor 110 in the raised position, hay from the main conveyor 24 will fall through the passage 104 onto the ground. A fluffer assembly, such as that described hereinabove, can be removably and retractably carried on the extension frame assembly 98 in similar manner as described above to fluff the hay as it falls to the ground.

Thus, the present invention provides a single device which can be used to both rake and ted a crop. The device can form windrows on either side of the device or directly behind the device.

It will be readily appreciated by those skilled in the art that modifications may be made to the invention without departing from the concepts disclosed in the foregoing description. Accordingly, the particular embodiments described in detail herein are illustrative only and are not limiting as to the scope of the invention, which is to be given the full scope of the appended claims and any and all equivalents thereof.

I claim:

1. A raking and tedding device, comprising:
   a frame;
   a main conveyor rotatably mounted on the frame, the main conveyor having an input end and a discharge end;
   a pick-up roller located adjacent the input end of the main conveyor; and
   a rear conveyor assembly located adjacent the discharge end of the main conveyor, the rear conveyor assembly including a first auxiliary conveyor having a first end and a second end and a second auxiliary conveyor having a first end and a second end, with the second end of each auxiliary conveyor pivotally mounted on the frame.

2. The device as claimed in claim 1, including a discharge chute located on the frame adjacent the second end of the at least one auxiliary conveyor.

3. The device as claimed in claim 1, including a fluffer assembly carried on the frame, the fluffer assembly including a plurality of fingers, with the fluffer assembly configured to move from a first position in which the fingers are not substantially aligned with the discharge end of the main conveyor to a second position in which the fingers are substantially aligned with the discharge end of the main conveyor and the auxiliary conveyors are configured to pivot to a second position such that material discharged from the main conveyor is received by the fluffer assembly when the fluffer assembly and the auxiliary conveyors are in the second position.

4. The device as claimed in claim 1, including a turn-over chute located on the frame adjacent the second end of the at least one auxiliary conveyor.

5. The device as claimed in claim 1, wherein the pick-up roller includes a plurality of elongated pick-up members projecting therefrom, wherein the pick-up members extend at an angle from the pick-up roller.

6. The device as claimed in claim 1, wherein the at least one auxiliary conveyor includes a first roller and a second roller rotatably mounted on a conveyor platform, with an auxiliary conveyor belt rotatably mounted around the first and second rollers.

7. The device as claimed in claim 1, wherein the second ends of the first and second auxiliary conveyors are attached to opposite sides of the frame.

8. The device as claimed in claim 1, wherein arcs of movement of the first end of the first auxiliary conveyor and the first end of the second auxiliary conveyor do not overlap.

9. The device as claimed in claim 1, wherein arcs of movement of the first end of the first auxiliary conveyor and the first end of the second auxiliary second conveyors overlap.

10. The device as claimed in claim 6, including a fluffer assembly carried on the frame, the fluffer assembly including a plurality of fingers, with the fluffer assembly configured to move from a first position in which the fingers are not substantially aligned with the discharge end of the main conveyor to a second position in which the fingers are substantially aligned with the discharge end of the main conveyor and the auxiliary conveyors are configured to pivot to a second position such that material discharged from the main conveyor is received by the fluffer assembly when the fluffer assembly and the auxiliary conveyors are in the second position.

11. The device as claimed in claim 10, wherein the second ends of the first and second auxiliary conveyors are attached to opposite sides of the frame.

12. The device as claimed in claim 11, wherein arcs of movement of the first end of the first auxiliary conveyor and the first end of the second auxiliary conveyor do not overlap.

13. The device as claimed in claim 11, wherein arcs of movement of the first end of the first auxiliary conveyor and the first end of the second auxiliary second conveyors overlap.

14. A raking and tedding device, comprising:

a frame;

a main conveyor rotatably mounted on the frame, the main conveyor having an input end and a discharge end;

a pick-up roller located adjacent the input end of the main conveyor; and a rear conveyor assembly located adjacent the discharge end of the main conveyor, wherein the rear conveyor assembly includes a first auxiliary conveyor having a first end and a second end and the second auxiliary conveyor having a first end and a second end, with the second end of each auxiliary conveyor pivotally mounted on the frame and configured to move from a first, operative position under the discharge end of the main conveyor to a second, inoperative position.

15. The device as claimed in claim 14, including an extension frame assembly mounted on the frame, the extension frame assembly including a pair of opposed side frames and a rear wall, with the side frames and rear wall defining a passage through the extension frame assembly and with the rear conveyor hingedly mounted on the extension frame assembly.

16. The device as claimed in claim 15, including a fluffer assembly removably carried on the extension frame assembly, the fluffer assembly including a plurality of fingers, with the fluffer assembly configured to move from a first position in which the fingers are not substantially aligned with the discharge end of the main conveyor to a second position where the fingers are substantially aligned with the discharge end of the main conveyor and the auxiliary conveyors are configured to pivot to a second position such that material discharged from the main conveyor is received by the fluffer assembly when the fluffer assembly and the auxiliary conveyors are in the second position.

17. The device as claimed in claim 16, including a discharge chute located adjacent the ends of the rear conveyor.

* * * * *